United States Patent
Kim et al.

(10) Patent No.: US 8,027,106 B2
(45) Date of Patent: Sep. 27, 2011

(54) IMAGE CAPTURING MODULE

(75) Inventors: Dae-kyung Kim, Changwon (KR);
In-hwan Lee, Changwon (KR);
Tae-hoon Jung, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 170 days.

(21) Appl. No.: 12/487,809

(22) Filed: Jun. 19, 2009

(65) Prior Publication Data

US 2009/0316284 A1    Dec. 24, 2009

(30) Foreign Application Priority Data

Jun. 20, 2008  (KR) .......................... 10-2008-0058362

(51) Int. Cl.
*G02B 7/02*     (2006.01)
*G02B 15/14*    (2006.01)
(52) U.S. Cl. .......... 359/824; 359/696; 359/554; 396/55; 396/79; 348/222.1; 348/208.11
(58) Field of Classification Search .......... 359/822–824, 359/694–698, 554, 557; 396/52–55, 79, 396/85, 133; 348/205, 207.99, 208.7, 208.11, 348/208.99, 222.1, 333.01, 374; 310/329
See application file for complete search history.

(56) References Cited

U.S. PATENT DOCUMENTS

| | | | |
|---|---|---|---|
| 7,009,786 B2 | 3/2006 | Bedzuk | |
| 7,457,060 B2 * | 11/2008 | Paik et al. | 359/824 |
| 7,489,458 B2 * | 2/2009 | Su et al. | 359/824 |
| 7,511,904 B2 * | 3/2009 | Hu et al. | 359/824 |
| 7,595,947 B2 * | 9/2009 | Lee et al. | 359/824 |
| 7,706,089 B2 * | 4/2010 | Koc et al. | 359/824 |
| 7,764,449 B2 * | 7/2010 | Koc et al. | 359/824 |

FOREIGN PATENT DOCUMENTS

| | | |
|---|---|---|
| JP | 11-318089 A | 11/1999 |
| JP | 2007-306660 A | 11/2007 |
| KR | 10-0770866 B1 | 10/2007 |

* cited by examiner

*Primary Examiner* — Loha Ben
(74) *Attorney, Agent, or Firm* — Sughrue Mion, PLLC

(57) ABSTRACT

An image capturing module is provided. The image capturing module includes: a lens assembly supporting at least one lens, moving along an optical axis of light indicating an image of a subject, and comprising guiding protrusions for guiding the moving the optical axis; a module supporting unit comprising guiding holes to which the guiding protrusions are inserted to guide the lens assembly; a lens driving unit comprising a winding vibration type piezoelectric motor and a piezoelectric motor supporting member, wherein the winding vibration type piezoelectric motor is disposed on the module supporting unit and moves the lens assembly along the optical axis and the piezoelectric motor supporting member supports the winding vibration type piezoelectric motor; a pressurizing member interposed between the piezoelectric motor supporting member and the module supporting unit; and a plurality of ball assemblies interposed between the module supporting unit and the lens assembly.

19 Claims, 4 Drawing Sheets

IMAGE CAPTURING MODULE

CROSS-REFERENCE TO RELATED PATENT APPLICATION

This application claims priority from Korean Patent Application No. 10-2008-0058362, filed on Jun. 20, 2008, in the Korean Intellectual Property Office, the disclosure of which is incorporated herein in its entirety by reference.

BACKGROUND OF THE INVENTION

1. Field of the Invention

Apparatuses consistent with the present invention relate to an image capturing module, and more particularly, to an image capturing module using a winding vibration type piezoelectric motor having a thin small volume and capable of performing a zoom or automatic focusing (AF) function in a digital camera.

2. Description of the Related Art

Currently, camera modules having an automatic focusing (AF) function or a zoom adjusting function implemented in mobile electronic devices, such as mobile phones, are being widely used. As the thickness of a camera module implemented in a mobile phone increases, the thickness of the mobile phone also increases. Thus, camera modules implemented in mobile phones may have a large volume and thickness.

In order to zoom or to automatically focus, a lens barrel supporting a lens may be moved along a guiding unit. As a driving unit for moving the lens barrel, a step motor or a piezoelectric motor is used. The step motor is driven by a step waveform (signal) based on an input pulse. Also, the step motor, which may be stepped, is controlled by a direct current source and driven by an electronic circuit, and has a rapid response in short-distance controlling.

However, in a step motor, since the size of an operating module increases due to increasing implementation of application parts, such as a reduction gear and connection parts, and an increasing size of the motor itself, and a cost of the motor increases due to the increasing implementation of the parts, a lens driving method using an ultrasonic motor such as a piezoelectric motor is widely used in camera modules employed in small digital cameras or mobile phones due to current light-weighted and minimized products.

Use of an ultrasonic motor is being gradually increased since an ultrasonic motor may be used to obtain high torque while being driven at low speed, may be manufactured in a structure different from that of a related art motor, and may not have a size limitation.

However, when a lens barrel driving device in a related art employing an inertia type piezoelectric motor is used, a piezoelectric motor driving unit needs to be disposed at a side of a lens module or a shutter module. Accordingly, a volume (width) of a side of the camera module increases.

Moreover, when a lens barrel driving device in a related art employing a winding vibration type piezoelectric motor is used, a driving unit may be disposed in a limited space, a lens module may be minutely controlled, and a lens and an image sensor may be maintained parallel to each other. However, in this case, the number of parts increases and an assembly tolerance of each part may be hardly reduced.

SUMMARY OF THE INVENTION

The present invention provides an image capturing module capable of reducing a volume thereof and reducing an assembly tolerance of each part in the image capturing module.

According to an aspect of the present invention, there is provided an image capturing module including: a lens assembly supporting at least one lens, moving along an optical axis of light indicating an image of a subject, and comprising guiding protrusions for guiding the moving along the optical axis; a module supporting unit comprising guiding holes to which the guiding protrusions are inserted so as to guide the lens assembly, and being disposed at the rear of the lens assembly on the optical axis; a lens driving unit comprising a winding vibration type piezoelectric motor and a piezoelectric motor supporting member, wherein the winding vibration type piezoelectric motor is disposed on the module supporting unit and moves the lens assembly along the optical axis and the piezoelectric motor supporting member supports the winding vibration type piezoelectric motor; a pressurizing member interposed between the piezoelectric motor supporting member and the module supporting unit; and a plurality of ball assemblies interposed between the module supporting unit and the lens assembly.

The number of the plurality of ball assemblies may be two and the two ball assemblies may be formed to be substantially symmetrical to each other with respect to the optical axis.

The plurality of ball assemblies may each include a plate and at least one ball combined to the plate, the balls each point contacting with the lens assembly and the module supporting unit.

The module supporting unit may include grooves therein and the plurality of ball assemblies may be inserted into the grooves.

The grooves may be formed in a V-letter form.

The number of guiding protrusions and guiding holes may be at least two and the plurality of ball assemblies may be disposed at sides of the guiding protrusion and guiding holes.

The pressurizing member may pressurize the piezoelectric motor toward the lens assembly.

The pressurizing member may be a coil spring.

The plurality of ball assemblies may prevent the lens assembly from tilting with respect to the module supporting unit.

The guiding protrusion may include a drive shaft at one side thereof and the lens driving unit may move the lens assembly along the optical axis using a frictional force with the drive shaft.

The winding vibration type piezoelectric motor may move the drive shaft along an optical axis direction due to elliptic trajectory movement of a tip at the one end of the winding vibration type piezoelectric motor adjacent to the drive shaft according to an applied signal.

The module supporting unit may include an image sensor that converts light indicating an image of a subject into an electric signal.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
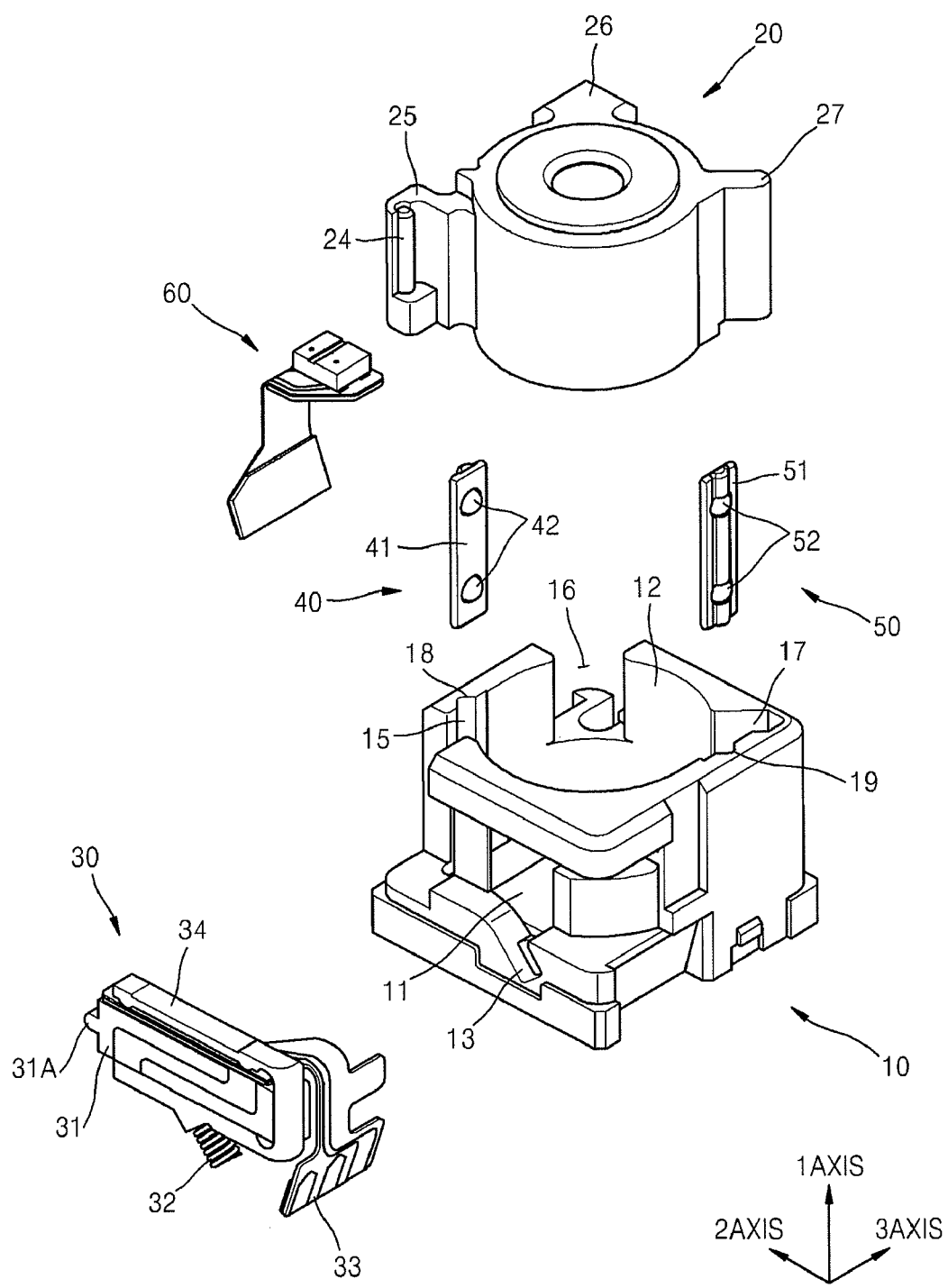
FIG. 1 is an exploded perspective view of an image capturing module according to an exemplary embodiment of the present invention.
Figure 2:
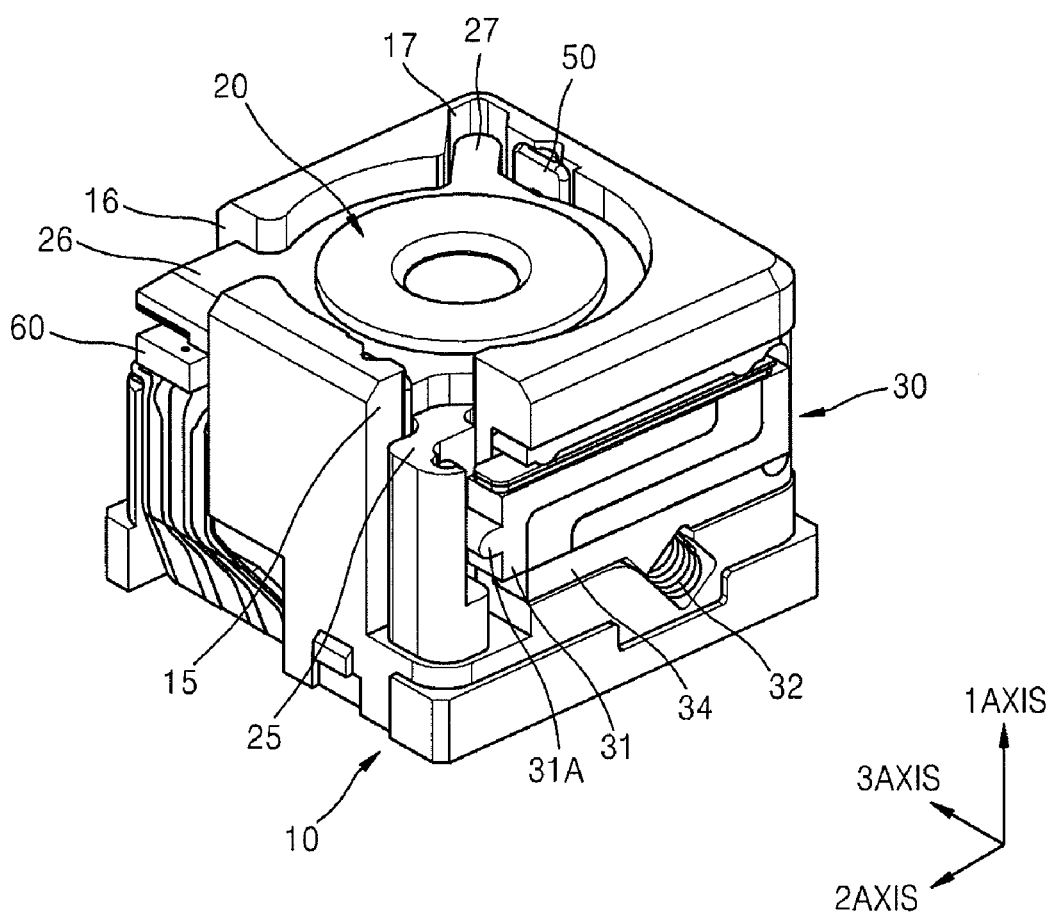
FIG. 2 is a combined perspective view of the image capturing module of FIG. 1 according to an exemplary embodiment of the present invention.
Figure 3:
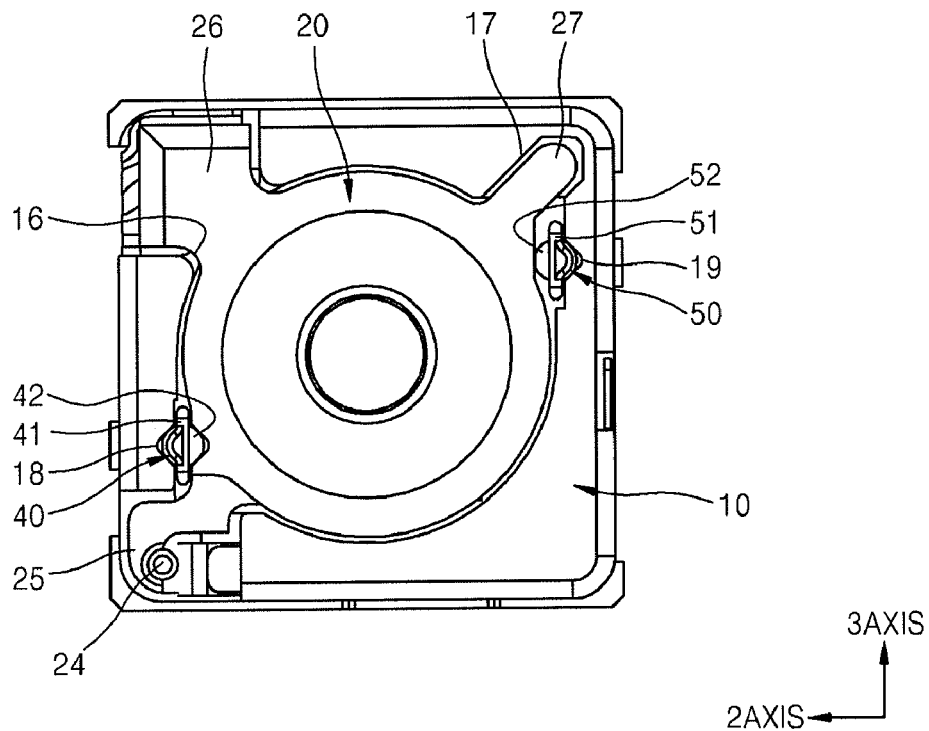
FIG. 3 is a plan view of the image capturing module of FIG. 2 according to an exemplary embodiment of the present invention.
Figure 4:
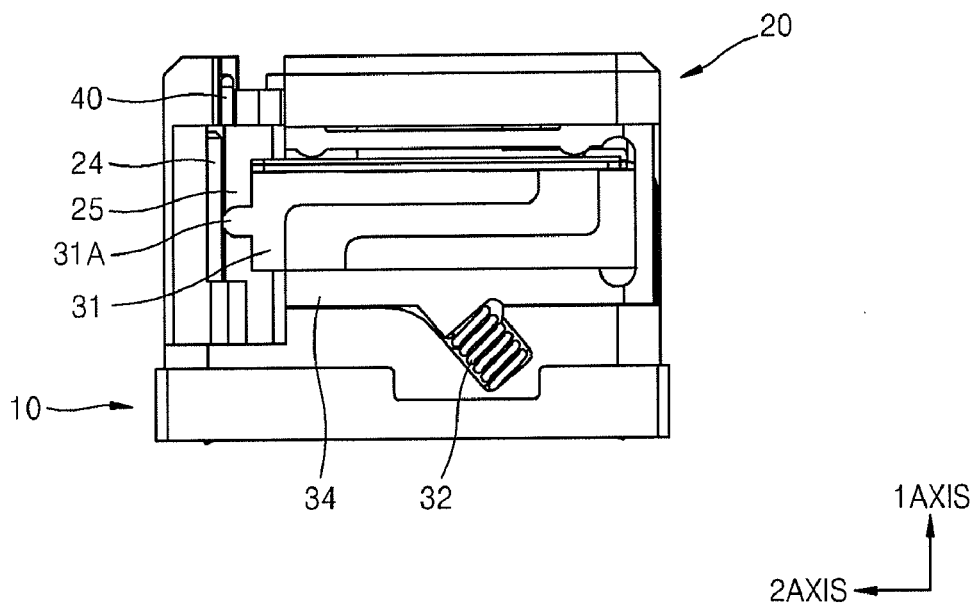
FIG. 4 is a front view of the image capturing module of FIG. 2 according to an exemplary embodiment of the present invention.

FIG. 1 is an exploded perspective view of an image capturing module according to an exemplary embodiment of the present invention; FIG. 2 is a combined perspective view of the image capturing module of FIG. 1; FIG. 3 is a plan view of the image capturing module of FIG. 2; and FIG. 4 is a front view of the image capturing module of FIG. 2.

Referring to FIGS. 1 through 4, the image capturing module according to an exemplary embodiment of the present embodiment includes a module supporting unit 10, a lens assembly 20, a lens driving unit 30, a first ball assembly 40, a second ball assembly 50, and a location sensor 60.

The module supporting unit 10 may include an image sensor 11 that may be a charge-coupled device (CCD) sensor or a complementary metal oxide semiconductor (CMOS) sensor. The module supporting unit 10 supports the lens assembly 20 and the lens driving unit 30. The module supporting unit 10 may be a rectangular parallelepiped and includes a hollow member 12 for accommodating the lens assembly 20 therein. Also, a cross-section of the module supporting unit 10 perpendicular to an optical axis, for example, the module supporting unit 10 at the bottom surface of the rectangular parallelepiped, may be a square. Here, the module supporting unit 10 includes four edges in a vertical direction (a first axis direction), wherein three edges from among the four edges each include a first guiding hole 15, a second guiding hole 16, and a third guiding hole 17. In the drawings, the first guiding hole 15, the second guiding hole 16, and the third guiding hole 17 are each formed in one of three edges of the rectangular parallelepiped module supporting unit 10. However, the present exemplary embodiment is not limited thereto and the first guiding hole 15, the second guiding hole 16, and the third guiding hole 17 may be disposed in appropriate locations according to the form and the structure of the module supporting unit 10, the lens assembly 20, and the lens driving unit 30.

A first groove 18, to which the first ball assembly 40 is fixed, is formed at one side of the first guiding hole 15 in the module supporting unit 10. Also, a second groove 19, to which the second ball assembly 50 is fixed, is formed at one side of the third guiding hole 17 in the module supporting unit 10. The first groove 18 and the second groove 19 may be formed in a V-letter form.

In addition, a pressurizing member holding unit 13, on which a pressurizing member 32 is placed, is formed at one side of the module supporting unit 10 in an oblique line direction.

The lens assembly 20 supports at least one lens and directs light indicating an image of a subject onto the image sensor 11. The lens assembly 20 may have a cylindrical form and includes a first guiding protrusion 25, a second guiding protrusion 26, and a third guiding protrusion 27 protruded from the side of the cylinder. The first guiding protrusion 25, the second guiding protrusion 26, and the third guiding protrusion 27 are inserted into the first guiding hole 15, the second guiding hole 16, and the third guiding hole 17, respectively. The first through third guiding protrusions 25, 26, and 27 and the first through third guiding holes 15, 16, and 17 guide straight line movement of the lens assembly 20 and maintain the image sensor 11 aligned along the first axis at all times. The first through third guiding protrusions 25, 26, and 27 of the lens assembly 20 may be moved in a direction along an optical axis of light indicating an image of a subject along the first through third guiding holes 15, 16, and 17. Therefore, while the lens assembly 20 is moved in one direction or another direction along the first through third guiding holes 15, 16, and 17, the lens assembly 20 performs an automatic focusing (AF) function, as well as, a zoom function. The lens assembly 20 at a cross-section taken along an optical axis is generally a square.

A drive shaft 24 is formed inside the first guiding protrusion 25 in the lens assembly 20. The drive shaft 24 interacts with a winding vibration type piezoelectric motor 31, which will be described later, so that the lens assembly 20 may be vertically moved, as will be described later.

The lens driving unit 30 moves the lens assembly 20 along an optical axis direction. The lens driving unit 30 includes the winding vibration type piezoelectric motor 31, the pressurizing member 32, and a piezoelectric motor supporting member 34. As illustrated in FIG. 1, the winding vibration type piezoelectric motor 31 is disposed perpendicular to the drive shaft 24, and a tip 31A of one end of the winding vibration type piezoelectric motor 31 is arranged to be close to a side of the drive shaft 24. The tip 31A moves along an elliptic trajectory in a clockwise direction or an anti-clockwise direction, and the winding vibration type piezoelectric motor 31 moves the lens assembly 20 along the drive shaft 24 via a frictional force with the drive shaft 24. Operation of the winding vibration type piezoelectric motor 31 will be described later with reference to FIGS. 5A and 5B.

The piezoelectric motor supporting member 34 is formed to accommodate the winding vibration type piezoelectric motor 31 therein and supports the winding vibration type piezoelectric motor 31 for the winding vibration type piezoelectric motor 31 to maintain a fixed position with respect to the module supporting unit 10.

The pressurizing member 32 is disposed in an oblique line direction, more specifically, in an oblique line direction with respect to a first axis and a second axis on a plane formed of the first axis and the second axis.

Second direction components of elasticity provided from the pressurizing member 32 pressurize the winding vibration type piezoelectric motor 31 toward the drive shaft 24. The pressurizing member 32 maintains the lens assembly 20 at a position by friction between the drive shaft 24 and the tip 31A of the winding vibration type piezoelectric motor 31 when the piezoelectric motor 31 stops. At the same time, first direction components of elasticity provided from the pressurizing member 32 pressurize the winding vibration type piezoelectric motor 31 toward an upper direction of the first axis. That is, the pressurizing member 32 pressurizes the piezoelectric motor 31 for uniform movement per uniform pulse when performing a winding operation of the piezoelectric motor 31

Here, in the drawings, the pressurizing member 32 is disposed on an oblique line direction at a lower side of the winding vibration type piezoelectric motor 31 and thus pressurizes the winding vibration type piezoelectric motor 31 upward in an oblique line direction. However, the present exemplary embodiment is not limited thereto and the location of the pressurizing member 32 may vary if the pressurizing member 32 may pressurize the winding vibration type piezoelectric motor 31 in a constant direction with a constant force.

Here, the pressurizing member 32 may be a coil spring. Since one pressurizing member 32 disposed in an oblique line direction is included, the image capturing module has fewer parts compared with image capturing modules in a related art, which include a number of pressurizing members, and thus, arrangement of parts in the image capturing module according to the present exemplary embodiment is flexible. Also, since a pressurizing member in a related art is formed of a leaf spring, when pressure above a given level is applied to the pressurizing member, a restoring force is rapidly decreased. However, since the pressurizing member 32 according to the present exemplary embodiment is formed of a coil spring, performance of the pressurizing member 32 significantly increases.

Moreover, a flexible printing circuit board (FPCB) 33 may be disposed at the front and the side of the winding vibration type piezoelectric motor 31 along the first axis, and an electric signal operating the winding vibration type piezoelectric motor 31 is provided through the FPCB 33.

The first ball assembly 40 and the second ball assembly 50 are interposed between the supporting unit 10 and the lens assembly 20. The first ball assembly 40 and the second ball assembly 50 prevent the lens assembly 20 from rotating (tilting) with respect to the module supporting unit 10.

The first and second ball assemblies 40 and 50 may be ball guides respectively including two balls 42 and 52 and plates 41 and 51. The ball assemblies 40 and 50, instead of surface contact between the module supporting unit 10 and the lens assembly 20, provide for point contact between the module supporting unit 10 and the lens assembly 20 via the balls 42 and 52, thereby decreasing a frictional force.

Referring to FIG. 3, the V-letter form first groove 18 and second groove 19 are formed at sides of the hollow member 12 of the module supporting unit 10. The first ball assembly 40 is interposed between one side of the first guiding protrusion 25 in the lens assembly 20 and the first groove 18 of the module supporting unit 10. In addition, the second ball assembly 50 is interposed between the one side of the third guiding protrusion 27 in the lens assembly 20 and the second groove 19 of the module supporting unit 10. Here, the first ball assembly 40 and the second ball assembly 50 are disposed across from each other on opposite sides of the hollow member 12.

The location sensor 60 is interposed between the module supporting unit 10 and the lens assembly 20 and senses a relative position of the lens assembly 20 with respect to the module supporting unit 10, thereby detecting an amount of movement of the lens assembly 20.

Accordingly, the winding vibration type piezoelectric motor 31 for friction movement and the first and second ball assemblies 40 and 50 for rolling friction are appropriately dispersed around the lens assembly 20, thereby reducing a size of the image capturing module. In addition, since surface contact between the module supporting unit 10 and the lens assembly 20 is reduced to the point contact of the balls 42 and 52, a frictional force is decreased. Also, the first and second ball assemblies 40 and 50 are used so as to secure a tolerance margin.

Figure 5A:
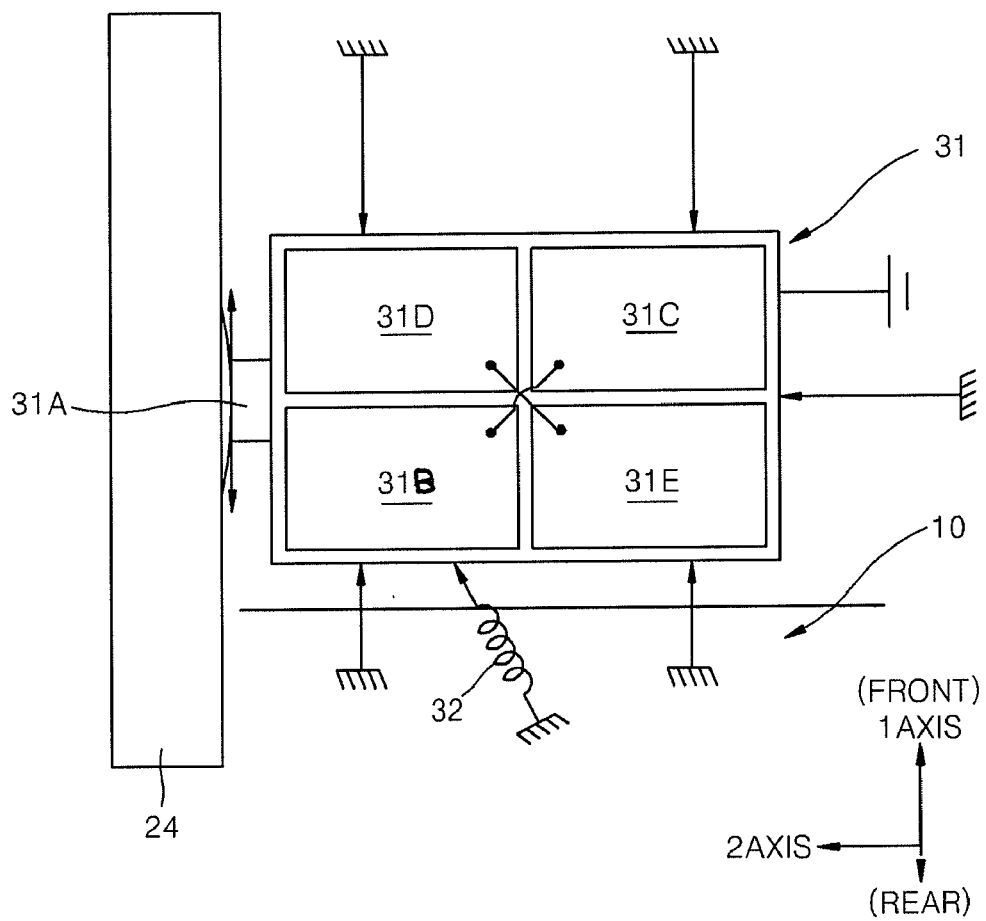
FIG. 5A is a view schematically illustrating a winding vibration type piezoelectric motor included in a lens driving unit according to an exemplary embodiment of the present invention.
Figure 5B:
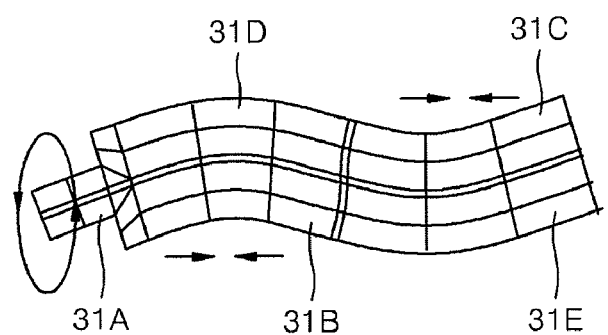
FIG. 5B is a view illustrating the winding vibration type piezoelectric motor included in a lens driving unit of FIG. 5A and its operating principle according to an exemplary embodiment of the present invention.

FIG. 5A is a view schematically illustrating the winding vibration type piezoelectric motor 31 included in the lens driving unit 30 according to an exemplary embodiment; and FIG. 5B is a view illustrating the winding vibration type piezoelectric motor 31 and its operating principle according to an exemplary embodiment.

Referring to FIG. 5A, the body of the winding vibration type piezoelectric motor 31 includes piezoelectric ceramic, a first pair of electrodes 31B and 31C, and a second pair of electrodes 31D and 31E. Two electrodes (31B and 31C or 31D and 31E) forming each pair are arranged in opposite corners with respect to the piezoelectric ceramic and are electrically connected to each other. The tip 31A is disposed at one end in the second axis direction of the winding vibration type piezoelectric motor 31 and is very close to or contacting the drive shaft 24. The pressurizing member 32 is disposed at the rear of the first axis direction of the winding vibration type piezoelectric motor 31. That is, the pressurizing member 32 is disposed in an oblique line direction, more specifically, in an oblique line direction with respect to a first axis and a second axis on a plane formed of the first axis and the second axis.

An alternating current (AC) voltage such as a sine wave, is selectively applied to the first pair of electrodes 31B and 31C and the second pair of electrodes 31D and 31E. For example, when a sine wave voltage (for example, a positive voltage) is applied to the first pair of electrodes 31B and 31C during a first ½ period, only the piezoelectric ceramic part corresponding to the first pair of electrodes 31B and 31C is constricted (or expanded) as illustrated in FIG. 5B. Thus, the shape of the entire piezoelectric ceramic is changed to a wave. On the other hand, when a sine wave voltage (for example, a negative voltage) is applied to the first pair of electrodes 31B and 31C during a next first ½ period, only the piezoelectric ceramic part corresponding to the first pair of electrodes 31B and 31C is expanded (or constricted). Accordingly, the shape of the entire piezoelectric ceramic is changed to a wave having an opposite phase. Since an AC voltage is continuously applied to the electrodes, the piezoelectric ceramic winds and vibrates, and the tip 31A of the piezoelectric ceramic moves along an elliptic trajectory in one direction, for example, a clockwise direction. Then, the tip 31A pushes the drive shaft 24 downward, and thus, the lens assembly 20 including the drive shaft 24 moves in a rear direction of the first axis.

Similarly to this, when a sine wave voltage is applied to the second pair of electrodes 31D and 31E, the piezoelectric ceramic winds and vibrates in opposition to the piezoelectric ceramic illustrated in FIG. 5B. Accordingly, the tip 31A of the piezoelectric ceramic moves along an elliptic trajectory in another direction, for example, an anti-clockwise direction. Then, the tip 31A pushes the drive shaft 24 upward, and thus, the lens assembly 20 including the drive shaft 24 moves in a front direction of the first axis.

According to the exemplary embodiments of the present invention, a volume of the image capturing module having an AF function or a zoom function is reduced and an assembly tolerance of each part may be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image capturing module comprising:
   a lens assembly that supports at least one lens, moves along an optical axis of light indicating an image of a subject, and comprises at least one guiding protrusion for guiding the movement of the lens assembly along the optical axis;

a module supporting unit that comprises at least one guiding hole to which the guiding protrusion is inserted to guide the lens assembly, and is disposed at a rear of the lens assembly on the optical axis;

a lens driving unit comprising a winding vibration type piezoelectric motor and a piezoelectric motor supporting member, wherein the winding vibration type piezoelectric motor is disposed on the module supporting unit and moves the lens assembly along the optical axis, and the piezoelectric motor supporting member supports the winding vibration type piezoelectric motor;

a pressurizing member, comprising a coil spring, interposed between the piezoelectric motor supporting member and the module supporting unit; and at least one ball assembly interposed between the module supporting unit and the lens assembly.

2. The image capturing module of claim 1, wherein a number of the at least one ball assembly is two and the two ball assemblies are formed to be substantially symmetrical to each other with respect to the optical axis.

3. The image capturing module of claim 1, wherein each of the at least one ball assembly comprises a plate and at least one ball combined to the plate, the at least one ball contacting with the lens assembly and the module supporting unit.

4. The image capturing module of claim 1, wherein the module supporting unit comprises at least one groove therein and the at least one ball assembly is inserted into the at least one groove.

5. The image capturing module of claim 4, wherein the at least one groove is formed in a V-letter form.

6. The image capturing module of claim 1, wherein a number of the at least one guiding protrusion is two, and a number of the at least one guiding hole is two, and
wherein the at least one ball assembly is disposed at a side of the at least one guiding protrusion and the at least one guiding hole.

7. The image capturing module of claim 1, wherein the pressurizing member pressurizes the piezoelectric motor toward the lens assembly.

8. The image capturing module of claim 1, wherein the at least one ball assembly prevents the lens assembly from tilting with respect to the module supporting unit.

9. The image capturing module of claim 1, wherein the guiding protrusion comprises a drive shaft at one side thereof and the lens driving unit moves the lens assembly along the optical axis using a frictional force with the drive shaft.

10. The image capturing module of claim 9, wherein the winding vibration type piezoelectric motor moves the drive shaft along an optical axis direction due to elliptic trajectory movement of a tip at one end of the winding vibration type piezoelectric motor adjacent to the drive shaft according to an applied signal.

11. The image capturing module of claim 10, wherein the winding vibration type piezoelectric motor comprises a piezoelectric material and two pairs of electrodes, two electrodes of each pair being connected to each other, and
wherein the elliptic trajectory movement is generated by applying the signal to the two pairs of the electrodes.

12. The image capturing module of claim 11, wherein the elliptic trajectory movement is generated by periodic constriction or expansion of the piezoelectric material, and
wherein if the signal is applied to a first pair of the electrodes, the lens assembly moves downward, and if the signal is applied to a second pair of the electrodes, the lens assembly moves upward.

13. The image capturing module of claim 11, wherein the pressurizing member pressurizes the piezoelectric motor toward the lens assembly, and
wherein the pressurizing member maintains the lens assembly at a position by friction between the drive shaft and the tip at the one end of the piezoelectric motor when the piezoelectric motor stops.

14. The image capturing module of claim 1, wherein the module supporting unit comprises an image sensor that converts the light indicating the image of the subject into an electric signal.

15. An image capturing module comprising:
a lens assembly that supports at least one lens, moves along an optical axis of light indicating an image of a subject, and comprises at least one guiding protrusion for guiding the movement of the lens assembly along the optical axis;

a module supporting unit that comprises at least one guiding hole to which the guiding protrusion is inserted to guide the lens assembly, and is disposed at a rear of the lens assembly on the optical axis;

a lens driving unit comprising a winding vibration type piezoelectric motor and a piezoelectric motor supporting member, wherein the winding vibration type piezoelectric motor is disposed on the module supporting unit and moves the lens assembly along the optical axis, and the piezoelectric motor supporting member supports the winding vibration type piezoelectric motor;

a pressurizing member interposed between the piezoelectric motor supporting member and the module supporting unit; and at least one ball assembly interposed between the module supporting unit and the lens assembly, wherein the guiding protrusion comprises a drive shaft at one side thereof and the lens driving unit moves the lens assembly along the optical axis using a frictional force with the drive shaft, wherein the winding vibration type piezoelectric motor moves the drive shaft along an optical axis direction due to elliptic trajectory movement of a tip at one end of the winding vibration type piezoelectric motor adjacent to the drive shaft according to an applied signal, wherein the winding vibration type piezoelectric motor comprises a piezoelectric material and two pairs of electrodes, two electrodes of each pair being connected to each other, wherein the elliptic trajectory movement is generated by applying the signal to the two pairs of the electrodes, wherein the pressurizing member pressurizes the piezoelectric motor toward the lens assembly, and wherein the pressurizing member maintains the lens assembly at a position by friction between the drive shaft and the tip at the one end of the piezoelectric motor when the piezoelectric motor stops, wherein the pressurizing member is disposed, on an oblique line direction with respect to a bottom surface of the module supporting unit, at a lower side of the piezoelectric motor to pressurize the piezoelectric motor upward in the oblique line direction.

16. An image capturing module comprising:
a lens assembly that supports at least one lens, and moves along an optical axis of light incident on the lens;
a module supporting unit that accommodates the lens assembly and comprises an image sensor disposed at a rear side of the lens assembly; and a lens driving unit that comprises a piezoelectric member formed of a piezoelectric material and comprising at least two electrodes;

a pressurizing member which is interposed between the piezoelectric member and the module supporting unit, and pressurizes the piezoelectric member toward the lens assembly, wherein the pressurizing member comprises a coil spring, wherein the pressurizing member is disposed, on an oblique line direction with respect to a bottom surface of the module supporting unit, at a lower side of the piezoelectric member to pressurize the piezoelectric member upward in the oblique line direction, and wherein the lens driving unit moves the lens assembly along the optical axis using a characteristic of the piezoelectric material and a voltage applied to the at least two electrodes.

17. The image capturing module of claim 16, wherein the piezoelectric member generates an elliptic trajectory movement of a tip disposed at one end of the piezoelectric member by applying the voltage to the at least two electrodes, and wherein the lens assembly moves along the optical axis by the elliptic trajectory movement.

18. The image capturing module of claim 17, wherein the elliptic trajectory movement is generated by periodic constriction or expansion of the piezoelectric material, wherein the at least two electrodes comprise two pairs of electrodes, two electrodes of each pair being connected to each other, and wherein if the voltage is applied to a first pair of the electrodes, the lens assembly moves downward, and if the voltage is applied to a second pair of the electrodes, the lens assembly moves upward.

19. The image capturing module of claim 17, wherein the pressurizing member pressurizes the piezoelectric member toward the lens assembly to maintain the lens assembly at a position when the elliptic trajectory movement stops.

* * * * *